(No Model.)
J. H. NEWBURY & G. A. CHAPMAN.
METHOD OF CUTTING SCREW THREADS.
No. 437,713. Patented Oct. 7, 1890.
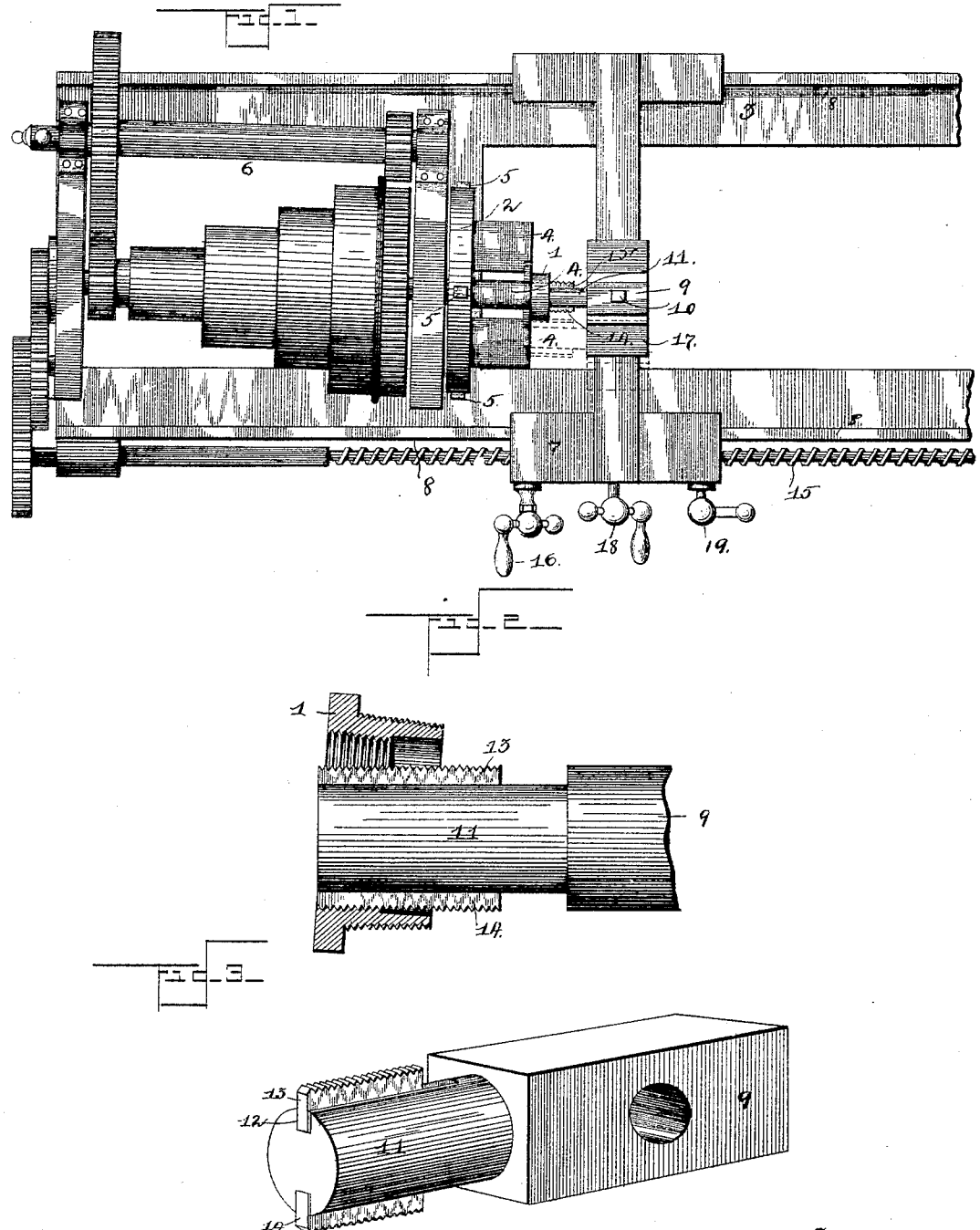
Witnesses
Horace G. Sutys
Wm. Bagger
Inventors
Jay H. Newbury and
George A. Chapman
By their Attorneys
C A Snow & Co.

UNITED STATES PATENT OFFICE.

JAY H. NEWBURY AND GEORGE A. CHAPMAN, OF GUILDERLAND, NEW YORK.

METHOD OF CUTTING SCREW-THREADS.

SPECIFICATION forming part of Letters Patent No. 437,713, dated October 7, 1890.

Application filed April 4, 1890. Serial No. 346,632. (No model.)

*To all whom it may concern:*

Be it known that we, JAY H. NEWBURY and GEORGE A. CHAPMAN, citizens of the United States, residing at Guilderland, in the county of Albany and State of New York, have invented a new and useful Method of Cutting Screw-Threads, of which the following is a specification.

Our invention relates to an improved method of cutting the screw-threads on the inner and outer sides of bushings for coupling gas and other pipes; and it has for its object to enable such screw-threads to be cut in a more speedy and effective manner than by the methods heretofore usually employed.

Our improved process will be hereinafter fully described with reference to the drawings hereto annexed, in which—

Figure 1 is a top plan view of a portion of an engine-lathe arranged in position for cutting the screw-threads on a bushing in accordance with our improved method. Fig. 2 is a detail sectional view of a bushing, showing the chaser arranged in an oblique direction in the inner side of the same in position for cutting the interior threads of the bushing. Fig. 3 is a detail perspective view of the chaser-holder and chaser.

Like numerals of reference indicate like parts in all the figures of the drawings.

The bushings employed for connecting gas and other pipes are provided with external and internal screw-threads, the outer and inner sides of the bushing being tapered in the same direction and arranged concentrically, so that when the bushing is coupled to the meeting ends of two pipes it effects a perfectly-tight joint between them.

Heretofore it has been the practice to make bushings of this character and of the smaller sizes of malleable iron by first cutting the interior screw-thread by means of a tap on a lathe, then removing the tap and substituting a screw-cutting die, and then cutting the external screw-thread, both tap and die rendering the use of oil or other lubricant necessary in cutting the threads on the bushing.

It has heretofore been necessary to employ malleable iron in the manufacture of bushings of the smaller sizes, for the reason that the shells or sides of the same are so thin that the bushing would be liable to be broken when subjected to the severe strain imposed when the tap is engaged in cutting the interior thread if the bushings were made of cast-iron.

The bushings made in the manner hereinbefore described are necessarily expensive, first, on account of the cost of the material— malleable iron;- secondly, because they have to be attached to and removed from the lathe twice during the processes of cutting the external and internal threads, and, thirdly, on account of the expense attendant on the use of lubricant and the labor of removing the residuum of oil from the bushings after the latter have been completed.

The object of our invention is to provide a method or process whereby a bushing may be provided with both external and internal screw-threads without the necessity of removing the bushing from the lathe until after it has been completed without the necessity of employing oil or other lubricant while cutting the threads, and without exerting excessive strain on the bushing during the process of its manufacture, thereby enabling us to manufacture bushings of the smaller sizes of cast-iron without the risk of breaking or injuring the same during the process of manufacture, and consequently enabling us to furnish a finished product of maximum strength at the smallest possible cost, and which shall be accurately screw-threaded, so that the inner threads shall be exactly concentric with the external threads.

In order to carry our process into effect we first take a cast-iron blank 1, such as shown in Fig. 1 of the drawings, and secure the same to the centering chuck 2 of an engine-lathe 3 by means of the usual clamping-jaws 4, which are operated in the customary manner by means of screws 5, the blank being permitted to project for a suitable distance—say two inches—beyond the face of the chuck.

The head 6 of the lathe, being swiveled or pivoted on its bearings in the usual manner, is turned in an oblique direction at an angle corresponding with that of the tapered sides of the bushing, and to the carriage 7 of the lathe, which travels on the usual guideways 8, is secured an arm or chaser holder 9 by means of a bolt 10. Said arm or chaser holder is arranged in a horizontal plane and parallel with the guides 8, and is provided at its end which is presented toward the chuck with a spindle 11, the same being provided on opposite sides with recesses or longitudinal grooves 12, the outer sides of which are open, as shown in Fig. 3. Into the said grooves or recesses on opposite sides of the spindle are inserted screw-cutting chasers or tools 13 14, which are adapted, respectively, to cut the exterior or interior screw-threads.

The carriage is operated longitudinally on the lathe by means of the usual screw 15 and the usual gearing having the operating-crank 16. The table 17, which carries the chaser-holder, is movable transversely on the carriage by means of the usual screw having handles 18, and the carriage may be connected to or disconnected from the screw 15 by means of the usual open or split nut (not shown) which is operated by the crank-handle 19.

Having arranged the blank in the position before described, and illustrated in Fig. 1, the operator moves the table 17 or the carriage until the cutting-edge of the chaser 14 is in line with the inner side of the blank. The spindle of the lathe is set in motion so as to impart rotary motion to the chuck and to the blank, and the operator moves the carriage on the bed of the lathe, so as to cause the chaser 14 to engage the inner side of the blank, as shown in Fig. 2, and to cut the internal screw-thread therein as the chaser passes through the said blank, as will be readily understood. The chaser, as will be seen by reference to Fig. 3, is comparatively narrow, and the combined width of the spindle 11 and chasers 13 14 is less than the internal diameter of the blank, and hence the chaser 14 is only in contact with a comparatively small portion of the internal area of the blank while it is operating therein, thus offering but a minimum amount of friction to the rotation of the blank, and cutting the screw-threads clearly and sharply without the use of oil or other lubricant and without exerting considerable disintegrating strain on the blank. As soon as the internal screw-thread has been completed, the operator, without arresting the rotation of the chuck and of the blank, moves the table of the carriage a slight distance, so as to cause the chaser 14 to clear or move out of contact with the internal thread of the blank, and he then opens the nut before mentioned, which engages the screw by means of the crank-handle and moves the carriage back to its initial position, when he again closes the nut on the screw and directs the chaser 13 to the outer side of the blank by moving the table a suitable distance laterally on the carriage, thereby causing the chaser 13 to cut the exterior screw-thread. Inasmuch as the relative position of the blank and of the chasers remains unchanged during the operation of cutting both the external and internal screw-threads, it follows that said threads must necessarily be exactly concentric with each other, and hence no irregularity can occur in this particular, thereby causing the bushing manufactured by our improved process to be superior in this respect to the bushings made in the usual way. As soon as the external thread is completed and the chaser moved from the bushing, the rotation of the spindle is arrested by the operator, the finished bushing is removed from the chuck and another substituted instead, and the process before described is repeated. Bushings thus manufactured can be turned out with great rapidity at more than twice the rate at which the ordinary bushing can be made and at a correspondingly reduced cost.

The process herein described and claimed is described but not claimed in Patent No. 423,729, issued to us on the 18th day of March, 1890, which is a division of this application.

Having described our invention, what we claim is—

1. The process of cutting external or internal screw-threads in bushings, which consists in rotating the bushing against a single chaser held upon an arm or spindle eccentrically to the axis of rotation, substantially as set forth.

2. A process of cutting screw-threads in bushings, which comprises the following steps, namely: first, mounting the bushing in the chuck of an engine-lathe; secondly, arranging a single chaser at an angle to the bushing and eccentrically to the axis of rotation, and, thirdly, imparting to the bushing a rotary and to the chaser a longitudinal movement, substantially as set forth.

3. The process of cutting external or internal screw-threads in bushings, which consists in subjecting the bushing-blank while being rotated to the action of a single longitudinally-movable chaser arranged eccentrically to the axis of rotation of the bushing, substantially as set forth.

4. The process of cutting external or internal screw-threads in bushings, which consists of subjecting the bushing-blank while being rotated to the action of a single longitudinally-movable chaser arranged eccentrically to the axis of rotation of the bushing-blank and at an angle thereto, substantially as set forth.

In testimony that we claim the foregoing as our own we have hereto affixed our signatures in presence of two witnesses.

JAY H. NEWBURY.
GEORGE A. CHAPMAN.

Witnesses:
CHARLES T. FOSTER,
O. F. BENNETT.